United States Patent
Lim et al.

(10) Patent No.: US 9,301,282 B2
(45) Date of Patent: Mar. 29, 2016

(54) METHOD AND APPARATUS FOR RESOURCE ALLOCATION FOR TRANSMITTING UPLINK DATA ON A COOPERATIVE TERMINAL IN A WIRELESS CONNECTION SYSTEM SUPPORTING TERMINAL CLIENT COOPERATION

(75) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/123,724

(22) PCT Filed: Jul. 13, 2011

(86) PCT No.: PCT/KR2011/005131
§ 371 (c)(1),
(2), (4) Date: Dec. 3, 2013

(87) PCT Pub. No.: WO2013/008966
PCT Pub. Date: Jan. 17, 2013

(65) Prior Publication Data
US 2014/0098777 A1  Apr. 10, 2014

(51) Int. Cl.
*H04W 72/04* (2009.01)
*H04B 7/02* (2006.01)
*H04W 4/00* (2009.01)

(52) U.S. Cl.
CPC .............. *H04W 72/04* (2013.01); *H04B 7/026* (2013.01); *H04W 72/0413* (2013.01); *H04W 4/005* (2013.01)

(58) Field of Classification Search
None
See application file for complete search history.

(56) References Cited

U.S. PATENT DOCUMENTS 8,599,736 B2 * 12/2013 Li et al. ................... 370/315
8,885,661 B2 * 11/2014 Zhang et al. ............. 370/437
(Continued)

FOREIGN PATENT DOCUMENTS

KR   10-2010-0048935    5/2010
KR   10-2010-0117522    11/2010
(Continued)

OTHER PUBLICATIONS

PCT International Application No. PCT/KR2011/005131, Written Opinion of the International Searching Authority dated Feb. 28, 2012, 5 pages.

*Primary Examiner* — Hassan Kizou
*Assistant Examiner* — Tejis Daya
(74) *Attorney, Agent, or Firm* — Lee, Hong, Degerman, Kang & Waimey

(57) ABSTRACT

The present invention relates to a resource allocation method for transmitting uplink (UL) data on a cooperative terminal during a process of client cooperation (CC) between terminals, wherein the method comprises the steps of: executing the client cooperation between the cooperative terminal and a source terminal; transmitting, by the cooperative terminal to a base station, an uplink resource allocation request message for transmitting uplink data corresponding to the cooperative terminal; receiving, by the cooperative terminal, first uplink resource allocation information responding to the uplink resource allocation message from the base station; and transmitting, by the cooperative terminal to the base station, uplink data corresponding to the cooperative terminal, through the first uplink resource allocation information, wherein the uplink resource allocation request message includes control information in order to differentiate between uplink data corresponding to the source terminal and the uplink resource allocation request message.

12 Claims, 8 Drawing Sheets

(56) References Cited

U.S. PATENT DOCUMENTS

| | | | |
|---|---|---|---|
| 2005/0053029 A1* | 3/2005 | Lee et al. | 370/328 |
| 2007/0072604 A1* | 3/2007 | Wang | 455/428 |
| 2007/0076684 A1* | 4/2007 | Lee et al. | 370/350 |
| 2007/0110016 A1* | 5/2007 | Shen et al. | 370/338 |
| 2008/0214193 A1* | 9/2008 | Jeong et al. | 455/436 |
| 2009/0197624 A1* | 8/2009 | Kwak et al. | 455/517 |
| 2010/0067467 A1* | 3/2010 | Cho et al. | 370/329 |
| 2010/0110972 A1* | 5/2010 | Kang et al. | 370/315 |
| 2010/0111061 A1* | 5/2010 | Zheng et al. | 370/338 |
| 2010/0135495 A1* | 6/2010 | Chion et al. | 380/273 |
| 2010/0260095 A1* | 10/2010 | Youn et al. | 370/315 |
| 2010/0272036 A1* | 10/2010 | Ramakrishna | 370/329 |
| 2010/0297936 A1* | 11/2010 | Nan | 455/7 |
| 2011/0310789 A1* | 12/2011 | Hu et al. | 370/315 |
| 2012/0015659 A1* | 1/2012 | Kalyani et al. | 455/436 |
| 2012/0026949 A1* | 2/2012 | Kotecha | 370/329 |
| 2012/0051256 A1* | 3/2012 | Yuda et al. | 370/252 |
| 2012/0093064 A1* | 4/2012 | Horiuchi et al. | 370/315 |
| 2012/0099556 A1* | 4/2012 | Kim et al. | 370/329 |

FOREIGN PATENT DOCUMENTS

| | | | |
|---|---|---|---|
| KR | 10-2011-0043893 | | 4/2011 |
| WO | WO2010125798 | * | 4/2010 |

* cited by examiner

FIG. 7
(a)
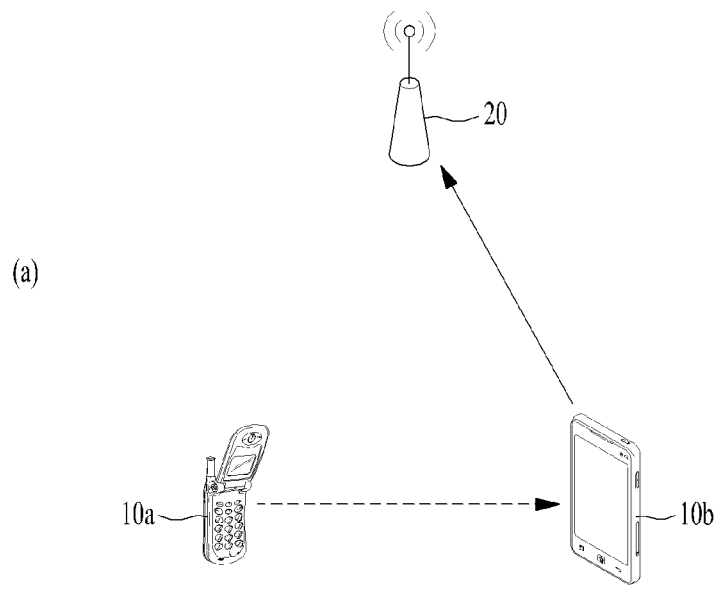
(b)
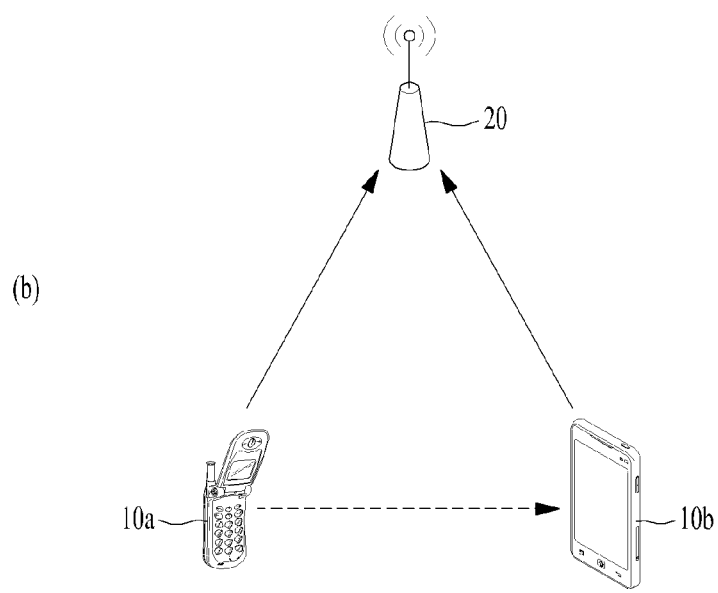
――――― 1st Network Transmission
(e.g., WiMAX uplink transmission)
- - - - - 2nd Network Transmission
(e.g., WiFi transmission)

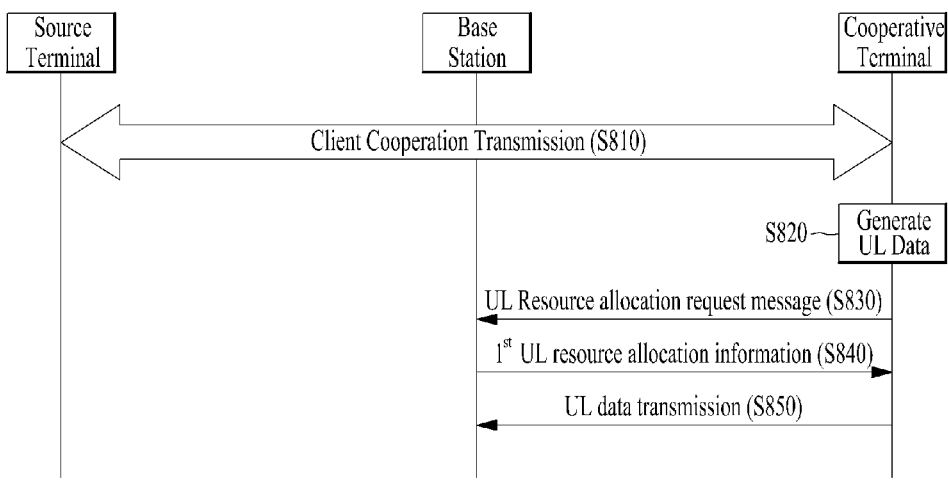
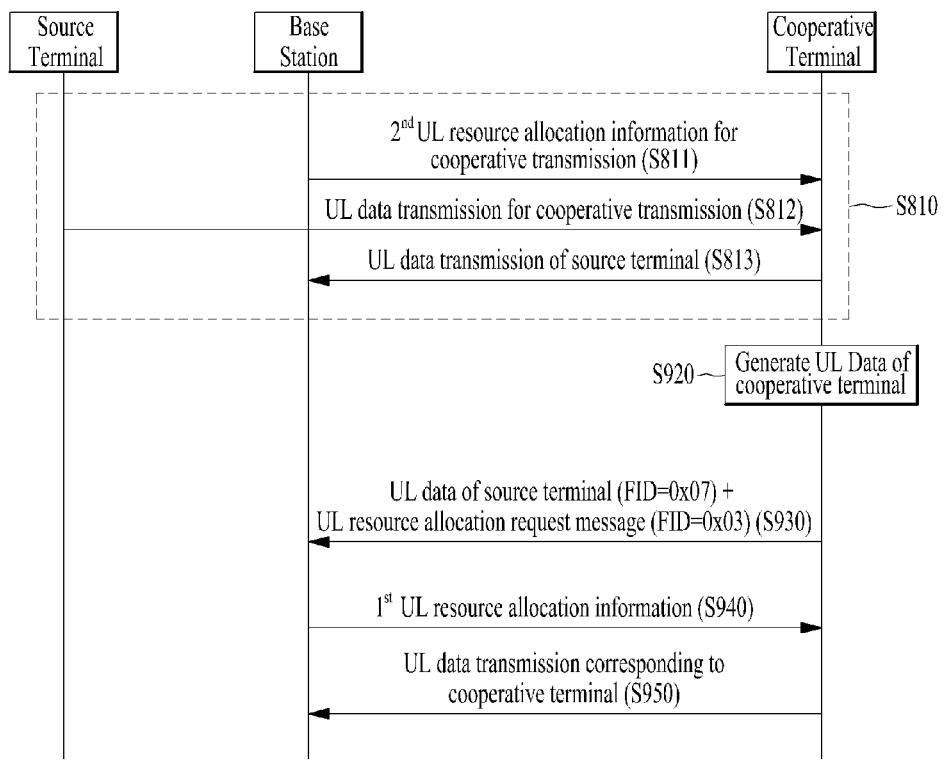

| USER MAC PDU(COOPERATION) | BR MAC PDU(FOR C-MS) |
|---|---|
| FID=0x1 | FID=0x3 |

METHOD AND APPARATUS FOR RESOURCE ALLOCATION FOR TRANSMITTING UPLINK DATA ON A COOPERATIVE TERMINAL IN A WIRELESS CONNECTION SYSTEM SUPPORTING TERMINAL CLIENT COOPERATION

CROSS-REFERENCE TO RELATED APPLICATIONS

This application is the National Stage filing under 35 U.S.C. 371 of International Application No. PCT/KR2011/005131, filed on Jul. 13, 2011, the contents of which are hereby incorporated by reference herein in their entirety.

FIELD OF THE INVENTION

The present invention relates to a wireless connection system supporting terminal client cooperation and, more particularly, to a method and apparatus for resource allocation for transmitting uplink data on a cooperative terminal.

BACKGROUND ART

In order to enhance transmission efficiency and throughput of a terminal having poor channel status, among multiple terminals existing in a cell, standardization for signal transmission and CO-MIMO (cooperative-MIMO) through a relay or femto cell in a 802.16m or LTE(-A) has been carried out. Moreover, in addition to the method for supporting a terminal by using the base station or a relay or femto cell, which performs the same operation as the base station, as described above, research on Client Cooperation (CC) transmission, which transmits signals through a cooperation between terminals, is currently being carried out in the 802.16m or LTE(-A).

Unlike the relay or femto cell, which is described above, CC refers to transceiving (transmitting/receiving) of signals between terminals (or user equipments or stations) via direct communication and cooperatively transmitting the transceived signal(s) to the terminal or base station.

When a source terminal and a cooperative terminal are cooperatively transmitting a signal from a UL region to the base station via client cooperation (CC) transmission, a signal that is intended to transmit UL data of the cooperative terminal itself may be generated, even in case of a cooperative terminal transmitting UL data of the source terminal to the base station. In this case, while performing the client cooperation transmission, in order to transmit its own signal, the cooperative terminal shall perform a resource request for signal transmission to the base station, so as to receive resource allocation for the UL signal transmission from the base station.

However, in the current CC operation, in case the cooperative terminal seeks to transmit its own UL data, while performing the client cooperation transmission, the detailed procedure respective to a resource allocation method of such case has not yet been defined.

First of all, a resource allocation request procedure of a general (802.16m system) terminal (or user equipment) will hereinafter be briefly described.

FIG. 1 illustrates an uplink resource allocation procedure using a contention-based request method.

Referring to FIG. 1, among many regions allocated via uplink for a Bandwidth Request, the terminal transmits a randomly selected CDMA code to a randomly selected slot (S110).

If the base station recognized the CDMA code transmitted from the terminal, the base station uses a CDMA allocation information element (CDMA_Allocation_IE), so as to allocate a resource, which is intended to enable the terminal to transmit a bandwidth request message (S120).

After receiving information on an uplink resource for transmitting the bandwidth request message, the terminal transmits the bandwidth request message to the respective resource region. At this point, the terminal may use a bandwidth request header (BR header), and information related to the size, and so on, of the requested bandwidth is included in the header (S130).

If the bandwidth requested by the terminal is available, the base station allocated an uplink resource to the terminal (S140). Thereafter, the terminal transmits data to the allocated uplink resource (S150).

FIG. 2 illustrates an exemplary 3-step random access based bandwidth request procedure.

In a wideband wireless connection (or access) system, the terminal may use a 3-step or 5-step random access method. The 5-step random access method may be used independently from the 3-step random access method, and the 5-step random access method may be used as a fall-back mode for a case when a malfunction occurs in the 3-step random access method.

A terminal (or AMS: Advanced Mobile Station) transmits a Bandwidth Request preamble sequence and a Quick Access Message to the base station at a randomly (or arbitrarily) selected opportunity (S210). Herein, the Bandwidth Request preamble sequence may also be expressed as a bandwidth request code (BR code).

At this point, a Station ID, which correspond to uplink bandwidth request information, and a BR index, which indicates the size of the bandwidth request and the QoS, and so on, may be included in the Quick Access Message.

The base station may transmit a BR ACK A-MAP information element, which indicates the reception status of the BR preamble sequence and the Quick Access Message transmitted from each terminal, to the terminals in the form of broadcast/multicast transmission (S220).

Once the base station has successfully received the BR preamble sequence and the Quick Access Message, the base station allocates uplink resource to each terminal and transmits uplink resource allocation information to each terminal through a UL basic assignment (or allocation) A-MAP IE (S230).

The terminal may transmit uplink data to the base station through the allocated uplink transmission region. At this point, the terminal may transmit additional uplink bandwidth request information to the base station along with the uplink data (S240).

FIG. 3 illustrates an exemplary 5-step random access based bandwidth request procedure corresponding to a fall-back mode for a case when a malfunction occurs in the 3-step.

The terminal transmits a BR preamble sequence (or BR code), uplink bandwidth request information (Station ID), a BR index indicating a request size and QoS, and so on, to the base station by using the Quick Access Message (S310).

The base station may transmit the reception status of the BR preamble sequence and the Quick Access Message, which are transmitted from each terminal, to the terminals in the form of broadcast/multicast transmission through a BR ACK A-MAP information element (IE). However, it will be assumed that the BR preamble sequence has been successfully decoded, yet that an error has occurred in the Quick Access Message. Therefore, the BR ACK A-MAP IE indicates that the BR preamble sequence has been successfully received and that an error has occurred in the Quick Access Message (S320).

In case the base station has only successfully received the BR preamble sequence, which is transmitted from the terminal, the base station allocates an uplink resource, which enables the terminal to transmit a bandwidth request (BW-REQ) message, to the terminal through a CDMA allocation A-MAP information element (CDMA Allocation A-MAP IE) (S330). In step S330, the CDMA Allocation A-MAP IE may be transmitted to the terminal in the form of a grant for an independent BR.

The terminal transmits a BW-REQ message (e.g., independent BR header format) to the base station through the allocated region (S340).

After receiving the BW-REQ message, which is transmitted from the terminal, the base station allocates uplink resource to the terminal by using UL basic assignment (or allocation) A-MAP IE or a grant message for uplink data transmission (S350).

The terminal transmits UL data to the base station through the allocated uplink resource region. At this point, the terminal may transmit additional uplink bandwidth request information to the base station along with the uplink data (S360).

More specifically, FIG. 3 illustrates the 5-step random access method as a fall-back mode of the 3-step random access method shown in FIG. 2. However, a general 5-step method is different from that shown in FIG. 3 in that the terminal does not transmit any Quick Access Message in step S310. And, the remaining process steps may be directly used and performed as described in FIG. 3.

DETAILED DESCRIPTION OF THE INVENTION

Technical Objects

An object of the specification of the present invention is to provide UL allocation request and allocation procedures enabling a cooperative terminal (or user equipment) to transmit its UL data to the base station, in case a source terminal (or user equipment) and a cooperative terminal (or user equipment) are transmitting signals or data to the base station via Client Cooperation (CC).

Technical Solutions

In the description of the present invention, in a resource allocation method of a cooperative terminal for transmitting uplink (UL) data during a client cooperation (CC) transmission procedure, the method includes the steps of having the cooperative terminal perform client cooperation (CC) transmission with a source terminal; having the cooperative terminal transmit an uplink resource allocation request message for transmitting uplink data respective to the cooperative terminal to a base station; having the cooperative terminal receive $1^{st}$ uplink resource allocation information from the base station as a response to the uplink resource allocation request message; and having the cooperative terminal transmit uplink data respective to the cooperative terminal to the base station through the $1^{st}$ uplink resource allocation request message, and, herein, the uplink resource allocation request message may include control information differentiating uplink data respective to the source terminal from the uplink resource allocation request message.

Additionally, the step of having the cooperative terminal perform client cooperation (CC) transmission with the source terminal may include the steps of having the cooperative terminal receive $2^{nd}$ uplink resource allocation information for transmitting uplink data of the source terminal from the base station; having the cooperative terminal receive uplink data of the source terminal from the source terminal; and having the cooperative terminal transmit uplink data of the source terminal to the base station through the $2^{nd}$ uplink resource allocation information.

Additionally, in the step of transmitting the uplink resource allocation request message, the uplink resource allocation request message may be transmitted through the $2^{nd}$ uplink resource allocation information.

Moreover, in the description of the present invention, the method may further include a step of having the cooperative terminal be allocated with feedback channel information from the base station, the feedback channel information being used for client cooperation transmission, and, in the step of transmitting the uplink resource allocation request message, the uplink resource allocation request message may be transmitted through the received feedback channel.

Additionally, the $1^{st}$ uplink resource allocation information may be transmitted to the cooperative terminal through the $2^{nd}$ uplink resource allocation information.

Additionally, the control information may correspond to a MAC signaling header type, and wherein the MAC signaling header type is configured of a 5-bit sequence.

Additionally, the MAC signaling header may include a terminal identifier (or station identifier (STID)) of the cooperative terminal or an FID of uplink data respective to the cooperative terminal. Moreover, the uplink resource allocation request message respectively may consist of a MAC PDU having an FID corresponding to a Client Cooperation transmission and a MAC PDU having an FID corresponding to uplink data of the cooperative terminal.

Additionally, the feedback channel may correspond to a dedicated feedback channel allocated to each of the source terminal and the cooperative terminal, or the feedback channel may correspond to a common feedback channel commonly allocated to the source terminal and the cooperative terminal.

Additionally, in case the feedback channel corresponds to the common feedback channel, the source terminal may use the common feedback channel through a feedback cycle consisting of short time intervals, and the cooperative terminal may use the common feedback channel through a feedback cycle consisting of long time intervals.

Additionally, the uplink resource allocation request message may be transmitted through the dedicated feedback channel, wherein the dedicated feedback channel is allocated to the source terminal.

Additionally, the uplink resource allocation request message being transmitted through the feedback channel may have a size of 6 bits.

Finally, in the description of the present invention, during a Client Cooperation (CC) transmission operation process between a first terminal requesting for the client cooperation transmission and a second terminal accepting the client cooperation (or terminal cooperation), in the second terminal configured to transmit uplink (UL) data of the second terminal, the second terminal includes a wireless (or radio frequency) communication unit configured to transceive (transmit/receive) a radio signal from an external source; and a control unit configured to be connected to the wireless communication unit. Herein, the controller may control the second device so as to perform client cooperation transmission with the first terminal, the controller may control the wireless communication unit so as to transmit an uplink resource allocation request message for transmitting UL data to the base station, the UL data being differentiated from UL data of the first terminal, the controller may control the wireless communication unit so as to receive uplink resource allocation information from the base station as a response to the uplink resource allocation request message, and the controller may control the wireless communication unit so as to transmit UL data to the base station through the received uplink resource allocation information, wherein the transmitted UL data may be differentiated from the UL data of the first terminal. Also, the uplink resource allocation request message may include control information differentiating uplink data of the first terminal from the uplink resource allocation request message.

Effects of the Invention

By newly defining a resource request method and a resource allocation method for enabling the cooperative user equipment its UL data, the specification of the present invention provides an effect of allowing the cooperative user equipment to transmit its own UL data to the base station while performing or after performing Client Cooperation (CC).

BRIEF DESCRIPTION OF THE DRAWINGS

FIGS. 7(a) and (b) respectively illustrates an exemplary Client Cooperation (CC) structure to which exemplary embodiment of the specification of the present invention can be applied.

FIG. 8 illustrates a flow chart showing a method for enabling the cooperative user equipment according to the exemplary embodiment of the present invention to transmit its own uplink data to the base station.

FIG. 9 illustrates a flow chart showing an uplink resource request (RR) procedure for having a cooperative user equipment according to another exemplary embodiment of the present invention transmit its own uplink data by using the uplink resource, which is allocated to the cooperative user equipment for Client Cooperation (CC).

MODE FOR CARRYING OUT THE PRESENT INVENTION

Figure 1:
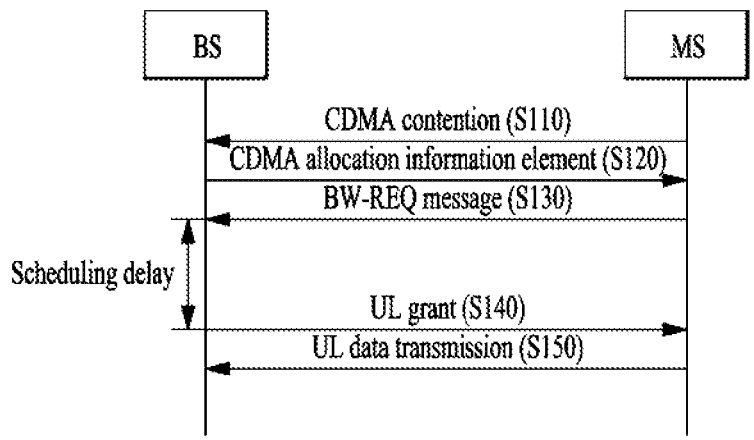
FIG. 1 illustrates an uplink resource allocation procedure using a contention-based request method.
Figure 2:
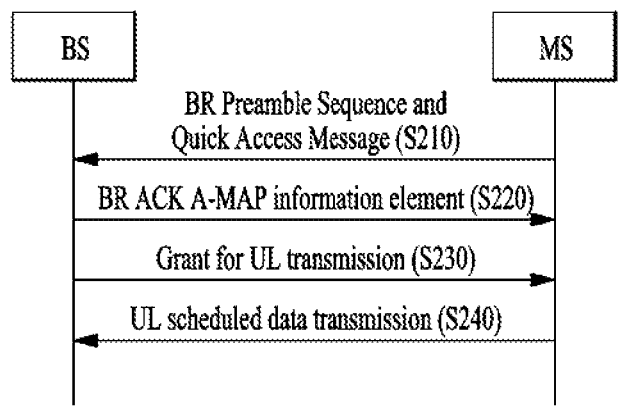
FIG. 2 illustrates an exemplary 3-step random access based bandwidth request procedure.
Figure 3:
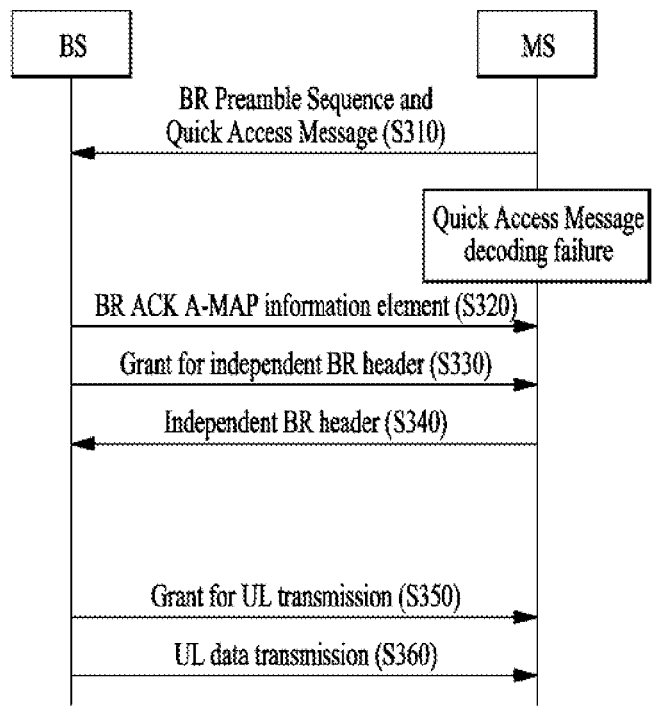
FIG. 3 illustrates an exemplary 5-step random access based bandwidth request procedure corresponding to a fall-back mode for a case when a malfunction occurs in the 3-step.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on.

Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. IEEE 802.16m corresponds to an evolution of the IEEE 802.16e and, therefore, provides backward compatibility with a system based upon the IEEE 802.16e.

The UTRA corresponds to a portion of the UMTS (Universal Mobile Telecommunications System).

And, as a portion of the E-UMTS (Evolved UMTS) using the E-UTRA (Evolved-UMTS Terrestrial Radio Access), the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity. Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

Figure 4:
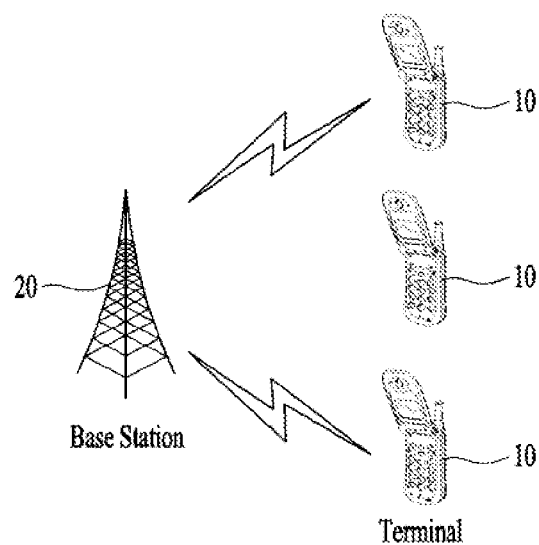
FIG. 4 illustrates a block view of a wireless communication system to which an exemplary embodiment of the specification of the present invention can be applied.

FIG. 4 illustrates a block view of a wireless communication system to which an exemplary embodiment of the specification of the present invention can be applied. A wireless communication system is extensively (or broadly) positioned in order to provide diverse communication services, such as voice (or audio) services, packet data services, and so on.

Referring to FIG. 4, the wireless communication system includes a Mobile Station (MS) (10) and a Base Station (BS) (20). The mobile station (10) may be fixed or may have mobility, and the mobile station may also be referred to as other diverse terms, such as UE (User Equipment), UT (User Terminal), SS (Subscriber Station), Wireless Device, AMS (Advanced Mobile Station), and so on.

Additionally, in case the wireless communication system shown in FIG. 4 supports Client Cooperation (CC) (or device cooperation communication (or transmission)), the mobile station (10) includes the concepts of a device cooperation requesting device requesting for device cooperation request, a device cooperation accepting device accepting device cooperation, a cooperation participating device participating in device cooperation.

Hereinafter, details related to device cooperation transmission (or Client Cooperation (CC)) will be briefly described.

Client Cooperation (CC) refers to having signals or data be transceived (or transmitted/received) via direct (link) communication between the devices and having the transceived (transmitted/received) signals to data cooperatively transmitted to the base station or user equipment (or device).

Herein, the devices (or user equipments or terminals) may be categorized as a Non-cooperative Terminal, a Cooperation-capable Terminal, a Cooperation participating terminal, a Cooperative transmission Terminal, a Cooperation Request Terminal, and so on. The Non-cooperative Terminal may also be referred to as a Single Transmission Terminal Additionally, the Cooperation-capable Terminal may also be referred to as a Cooperative Terminal Candidate.

Herein, the Cooperation participating terminal refers to a terminal (or device) participating in the cooperative transmission yet not transmitting any data to the base station.

Hereinafter, in the specification of the present invention, the device requesting for the device cooperation transmission (or client cooperation) may be expressed as a first device, and the device having accepted the device cooperation transmission, i.e., the device having transmitted the UL data of the first device may be expressed as a second device.

As described above, the first device may be referred to as a Cooperation requesting device (or terminal), a Source Mobile Station (S-MS), a cooperation subject terminal, and so on. And, the second device may be referred to as a Cooperation accepting device (or terminal), a Cooperation Mobile Station (C-MS), a Target Mobile Station (T-MS), a terminal being subjected to cooperation, and so on. Herein, the second device corresponds to a collective term including all of the cooperative transmission terminal or the cooperation participating terminal.

More specifically, the first device (or terminal) refers to a terminal (or device) acting as a subject performing data transception (or transmission/reception) with the base station and/or a relay station, and the second device (or terminal) refers to a terminal (or device) helping (or aiding) the data transception (or transmission/reception) between the source terminal (or device) and the base station and/or relay station.

Additionally, direct transmission between two terminals (or devices) performing cooperative transmission may use a single RAT or multi-RAT. At this point, in case the terminal (or device) performing device cooperative transmission (or client cooperation) supports Multi-RAT, an RAT other than the RAT (Radio access transmission), which is being used for signal transmission with the base station, may be used for the signal transception (or transmission/reception) between the two devices. This will be described in more detail later on with reference to FIG. 5.

Additionally, the base station transmit information related to the client cooperation (or terminal cooperation) transmission operation to the two terminals (source terminal and cooperative terminal) performing cooperative transmission. At this point, the DL signal may include the information for CC as described below.

More specifically, the CC_Transmission_info includes the following information (1) to (6).

(1) Terminal pairing (or CC pairing) or grouping information (grouping ID) for performing client cooperation transmission may be included, or, in case Grouping or pairing ID is not used, terminal ID (STID or C-RNTI) of a terminal performing CC operations may be included.

(2) Resource allocation information for CC

Herein, the Resource allocation information for CC includes UL resource info, which is allocated by the base station for the CC operations, a number of RBs or subbands, index of RB or subband, start point of a symbol or carrier, and so on.

(3) Power control offset and initial transmission power (initial Tx power) information (4) Transmission information related to MIMO, rank, MCS (5) Time offset information indicating the beginning (or start point) of a CC operation (6) Information indicating the beginning (or start point) of another RAT (Other RAT start indicator)

For example, an indicator for the beginning (or start point) of Wi-Fi operations and channel index information is included.

The client cooperation transmission (or communication) will hereinafter be described in detail with reference to FIGS. 5 to 7.

The base station (20) generally refers to a fixed station performing communication with the terminal (or user equipment) (10), and the base station (20) may also be referred to as other terms, such as NodeB, BTS (Base Transceiver System), Access Point, and so on. At least one or more cell may exist in one base station (20).

The wireless communication system may correspond to an OFDM (Orthogonal Frequency Division Multiplexing)/ OFDMA (Orthogonal Frequency Division Multiple Access) based system.

The OFDM uses multiple orthogonal subcarriers. The OFDM uses the orthogonal characteristics between IFFT (inverse fast Fourier Transform) and FFT (fast Fourier Transform). The transmitter performs IFFT on the data and transmits the processed data. The receiver performs FFT on the received signal and recovers the original (or initial) data. The transmitter uses the IFFT in order to couple (or group) the multiple subcarriers, and, in order to divide (or split) the multiple subcarriers, the receiver uses the corresponding FFT.

Wireless Communication Environment Configured of Heterogeneous Networks

Figure 5:
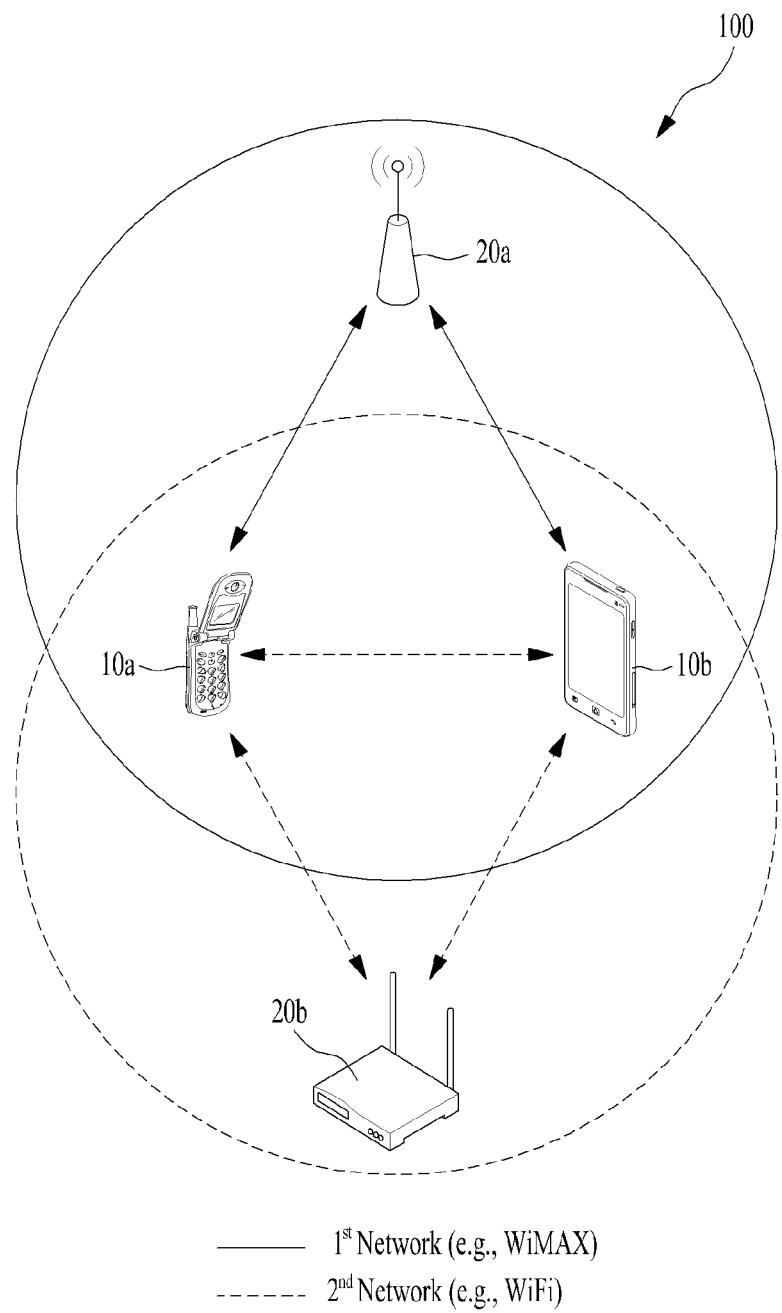
FIG. 5 illustrates an exemplary system performing Client Cooperation (CC) in a wireless communication environment having at least 2 or more heterogeneous networks (Multi-RAT) existing therein, the system having the exemplary embodiment of the specification of the present invention applied thereto.

FIG. 5 illustrates an exemplary system performing Client Cooperation (CC) in a wireless communication environment having at least 2 or more heterogeneous networks (Multi-RAT) existing therein, the system having the exemplary embodiment of the specification of the present invention applied thereto.

In a mobile communication system, the User Equipment (or terminal) may receive information from the base station via downlink, and the user equipment (or terminal) may transmit information via Uplink. The information being transmitted or received by the terminal may include data and diverse control information, and diverse physical channels may exist depending upon the type and purpose of the information being transmitted or received by the terminal.

In the current communication environment, 2 or more heterogeneous networks, each being different from one another, may exist. For example, diverse heterogeneous networks may exist, such as a WiMAX network, which corresponds to an example of the mobile communication system, and a WiFi network using a WiFi net. Based upon a specific network, a heterogeneous network refers to a network using a communication method other than the communication used in the specific network. And, a heterogeneous terminal (or user equipment) refers to a terminal belonging to a heterogeneous network using a communication method other than the communication used in the specific network.

For example, based upon a terminal belonging to a WiMAX network and a WiFi network, since the WiFi network uses a communication method other than that of the WiMAX network, the WiFi network corresponds to a heterogeneous network, and a terminal (or user equipment) belonging to the WiFi network corresponds to a heterogeneous terminal Conversely, however, based upon the WiFi network, the WiMAX network may correspond to the heterogeneous network, and the terminal (or user equipment) belonging to the WiMAX network may correspond to the heterogeneous terminal.

Additionally, a "multi-mode terminal", which is used in the present invention, refers to a terminal supporting the usage of 2 or more heterogeneous networks (or a plurality of RATs). WiFi refers to a close-range communication network (LAN), which can provide high rate internet services within a predetermined area range from a location where a radio access point is installed. Herein, WiFi uses a radio wave or ultra-red light ray transmission method and is generally referred to as a wireless (or radio) LAN.

In a wireless environment, a multi mode terminal may use a heterogeneous network existing for the support of a heterogeneous terminal in addition to RAT (Radio access technology) (hereinafter referred to as RAT), which is being serviced to the multi mode terminal in order to efficiently transceive (transmit/receive) signals or to enhance throughput. The RAT corresponds to a technology type that is used in radio access. For example, RAT includes GERAN (GSM/EDGE Radio Access Network), UTRAN (UMTS Terrestrial Radio Access Network), E-UTRAN (Evolved-UMTS Terrestrial Radio Access Network), WiMAX, LTE(-A), WiFi. GERAN, UTRAN, E-UTRAN, WiMAX, and/or WiFi co-exist in the same region (or zone).

At this point, a multi mode terminal supporting multiple RAT, so that 2 or more heterogeneous networks can be used, may transceive signals by using another RAT, which can be provided with the best service, in the current terminal (or user equipment) situation without being dedicated only to a specific RAT. The number of heterogeneous networks (multiple RATs) being accessed in order to allow the multi mode terminal to transceive signals may be equal to or greater than 2. Therefore, the multi mode terminal may transceive signals from a base station using an RAT different from that of the serving base station or from base stations using heterogeneous networks (heterogeneous RATs) either individually or via cooperation.

Referring to FIG. 5, the terminal included in the wireless communication system (100) may transceive signals by using 2 or more heterogeneous networks (or multiple RATs).

In FIG. 5, for example, the terminal transceives a signal by using a first network (e.g., WiMAX network) and a second network (e.g., WiFi network). A first terminal (10a) and a second terminal (10b) of the wireless communication system correspond to multi mode terminals, which can use 2 or more heterogeneous networks, i.e., which can support Multi-RAT.

More specifically, as shown in the example of FIG. 5, the first terminal (10a) and the second terminal (10b) support multi mode, so that signals can be transceived through the WiMAX network and the WiFi network, each corresponding to a heterogeneous network.

At this point, a Base Station (BS) (20a) of the first network (WiMAX network) may exist in the wireless communication system (100). The first terminal (10a) and the second terminal (10b) supporting multi-RAT in the wireless communication system may transceive signals to and from the base station (20a) through the first network (WiMAX).

Additionally, an Access Point (AP) (20b) corresponding to the base station of the second network (WiFi network) may exist in the wireless communication system (100). The first terminal (10a) and the second terminal (10b) supporting multi-RAT in the wireless communication system may transceive (transmit/receive) signals to and from one another through the second network (WiFi).

More specifically, the first terminal (10a) and the second terminal (10b) within the wireless communication system (100) may perform communication through the access point (20b) depending upon the configuration on an Infrastructure Mode, or the first terminal (10a) and the second terminal (10b) may perform direct communication between one another depending upon the configuration of an Ad-hoc Mode. Hereinafter, even if there is no detailed description on the access point (20b), it will be provided that the first terminal (10a) and the second terminal (10b) can transceive information to and from one another through the second network (WiFi).

In the present specification, it will be assumed that the Client Cooperation (CC) communication, which is performed between the first terminal (10a) and the second terminal (10b), is designated to the second network (WiFi network) being different from the first network (WiMAX network), which corresponds to a cellular network, and corresponding to a direct link between each terminal. As described above, in the present specification, although the WiFi network is disclosed as an example of the direct link between terminals, the present invention will not only be limited to this.

Meanwhile, in order to transceive signals via client cooperation (CC) communication, grouping or pairing is performed on the first terminal (10a) and the second terminal (10b). The grouping or pairing between the first terminal (10a) or second terminal (10b) may be performed and realized by using a method of deciding a counterpart terminal that is to perform cooperative communication, among one of the terminals, or by using a method of indicating information of terminals to which the base station (20a) is to perform cooperative communication.

FIGS. 6(a) and (b) respectively illustrates the concept of a cooperative cluster of the user equipments to which the exemplary embodiment of the specification of the present invention can be applied.

Figure 6:
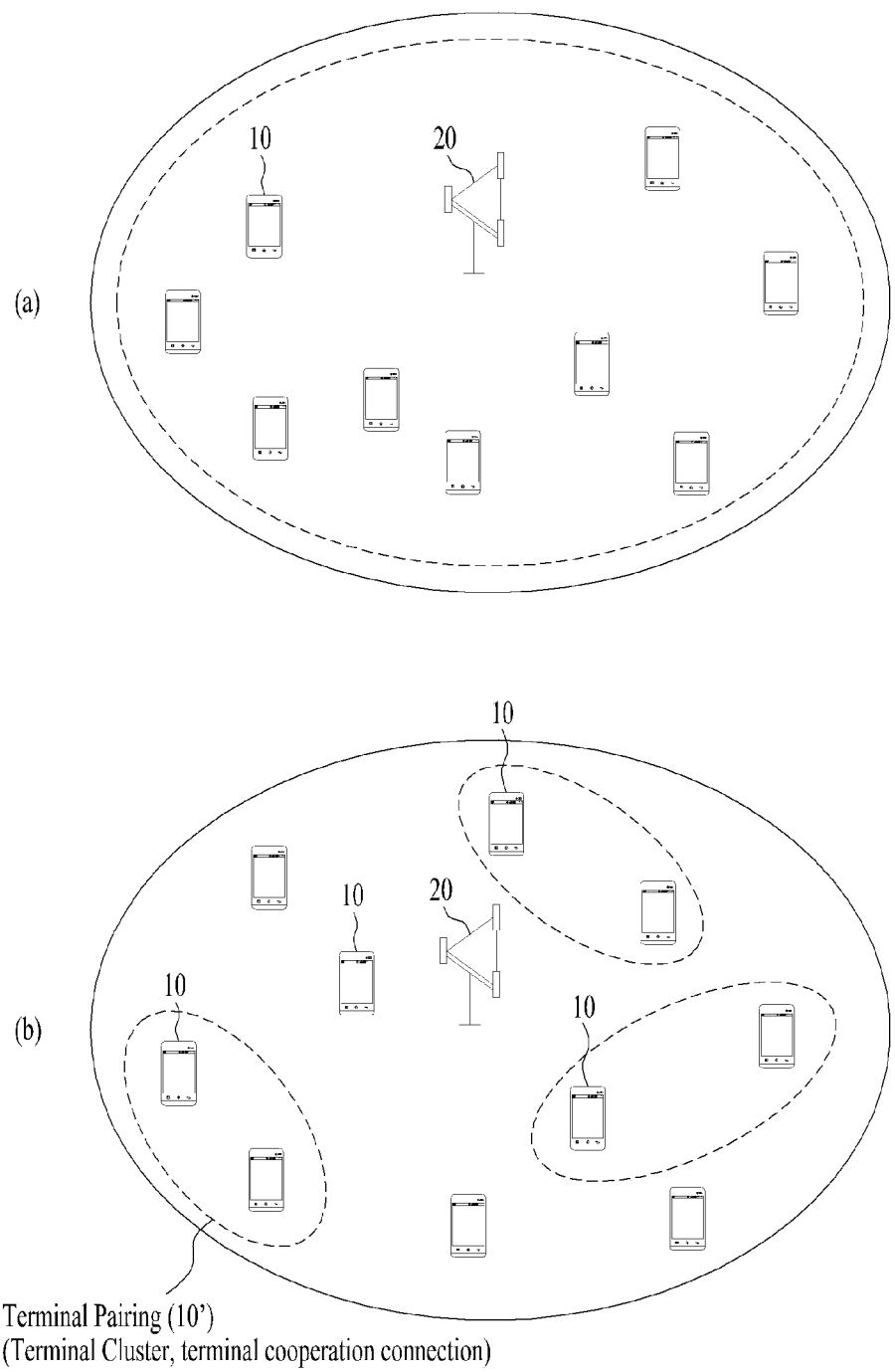
FIGS. 6(a) and (b) respectively illustrates the concept of a cooperative cluster of the user equipments to which the exemplary embodiment of the specification of the present invention can be applied.

As shown in FIG. 6, the cooperation-capable terminals may be grouped as a virtual group, which is referred to as a Cooperative Cluster (10'). Herein, the Cooperative Cluster (10') may also be referred to as different terms, such as Client Cooperation Connection, terminal pairing, and so on.

More specifically, as shown in FIG. 6(a), the Cooperative Cluster (10') may include all terminals capable of performing cooperative transmission, or, as shown in FIG. 6(b), the Cooperative Cluster (10') may include cooperation-capable terminals based upon a regional Geometry.

If a terminal enters a base station (otherwise referred to as Network Entry), the Cooperative Cluster (10') may be generated by the base station, or the Cooperative Cluster (10') may be generated by directly establishing a cooperative relation between terminals.

If the Cooperative Cluster (10') is generated by the base station, information on the Cooperative Cluster may be periodically broadcasted by the base station. Alternatively, information on the Cooperative Cluster may be unicasted to each terminal in accordance with a request from a terminal.

If the terminals configure the Cooperative Cluster on their own, the information on the Cooperative Cluster may be unicasted or multicasted by the terminals or by an arbitrary terminal.

Meanwhile, it is shown in FIG. 6 that, during the cooperative transmission, Cooperative Clusters are generated with respect to only the terminals belonging to a cell of one base station.

Operation Mode of Client Cooperation (CC)

FIGS. 7(a) and (b) respectively illustrates an exemplary Client Cooperation (CC) structure to which exemplary embodiment of the specification of the present invention can be applied.

Referring to FIGS. 7(a) and (b), diverse modes for performing Client Cooperation (CC) communication in a terminal supporting multi-RAT will hereinafter be described in detail. Hereinafter, although the term mode is used for simplicity in the differentiation, the operations will not be limited only to the term mode.

In (a) and (b) of FIG. 7, the first terminal (10a) and the second terminal (10b) are in a relation of performing Client Cooperation (CC) communication, and, herein, the first terminal (10a) operates as a source terminal (S-MS) that is to transmit data to the base station (20a), and the second terminal (10b) operates as a cooperative terminal (C-MS), which aids the data transception of the first terminal (10a) via Client Cooperation (CC) communication.

The client cooperation (CC) communication of the terminal supporting the multi-RAT is applied, in case a propagation loss between the source terminal and the base station in the RAT is large, or in case the channel status is poor, and, additionally, the client cooperation (CC) communication of the terminal supporting the multi-RAT is also applied, when CC is required due to a device status (e.g., lack of battery amount) of the source terminal, regardless of the channel status, and the client cooperation (CC) communication of the terminal supporting the multi-RAT may also be applied, when the user of other source terminals requests for a fast rate/urgent transmission.

As described above, the terminal supporting multi-RAT may operate in accordance with a relaying mode or a cooperative transmission mode in order to transceive data through the client cooperation (CC) communication.

(a) of FIG. 7 illustrates an example of the terminal supporting multi-RAT performing Client Cooperation (CC) communication in accordance with the relaying mode. In the relaying mode, the source terminal (S-MS), which seeks to transmit data to the base station, transmits data to the cooperative terminal (C-MS), and the cooperative terminal (C-MS) transmits the data, which are received from the source terminal (S-MS), to the base station.

Referring to FIG. 7(a), for a more detailed description, the source terminal (10a) supporting the multi-RAT transmits data to the cooperative terminal (10b) through an RAT corresponding to a direct link, i.e., through the second network, and the cooperative terminal (10b) transmits the received data to the base station (20) through the first network, which corresponds to an RAT other than the RAT corresponding to the direct link. As described above, the cooperative terminal (10b) should be allocated with an uplink resource (UL resource) in order to transmit the data. At this point, the UL resource may be allocated from the base station (20) upon request from the source terminal (10a) or the cooperative terminal (10b).

(b) of FIG. 7 illustrates an example of the terminal supporting multi-RAT performing Client Cooperation (CC) communication in accordance with the cooperative transmission mode. In the cooperative transmission mode, the source terminal (S-MS), which seeks to transmit data to the base station, transmits data to the cooperative terminal (C-MS), and the source terminal (S-MS) and the cooperative terminal (C-MS) cooperatively transmit the data to the base station.

Referring to FIG. 7(b), for a more detailed description, the source terminal (10a) supporting the multi-RAT transmits data to the cooperative terminal (10b) through an RAT corresponding to a direct link, i.e., through the second network, and the source terminal (10a) and the cooperative terminal (10b) transmits the received data to the base station (20) through the first network, which corresponds to an RAT other than the RAT corresponding to the direct link by performing cooperative transmission.

Hereinafter, as proposed in the present description, a UL resource request and allocation method performed by the cooperative terminal, which performs cooperative transmission with the source terminal, in order to transmit its own uplink (UL) data to the base station will be described in detail.

FIG. 8 illustrates a flow chart showing a method for enabling the cooperative user equipment according to the exemplary embodiment of the present invention to transmit its own uplink data to the base station.

Referring to FIG. 8, the cooperative terminal performs Client Cooperation (CC) transmission with the source terminal (S810).

Herein, the Client Cooperation (CC) transmission procedure between the cooperative terminal and the source terminal may be performed by following the process steps described below.

First of all, in order to perform client cooperation transmission with the source terminal, the cooperative terminal receives second ($2^{nd}$) uplink resource allocation information for transmitting the uplink data of the source terminal from the base station. Additionally, the base station transmits CC UL resource allocation information, which enables the source terminal to transmit UL data caused by cooperative transmission to the cooperative terminal, to the source terminal and the cooperative terminal.

Subsequently, the source terminal uses the CC UL resource allocation information, which is received by the cooperative terminal from the base station, i.e., uses the CC UL resource allocation region, so as to transmit the UL data of the source terminal to the cooperative terminal.

Thereafter, the cooperative terminal transmits the UL data, which are received from the source terminal, to the base station through (or by using) the $2^{nd}$ uplink resource allocation information. Herein, the source terminal and the cooperative terminal may simultaneously transmit the UL data of the source terminal to the base station by using the $2^{nd}$ UL resource allocation region, and only the cooperative terminal may transmit the UL data of the source terminal to the base station by using the $2^{nd}$ UL resource allocation region. More specifically, the source terminal and the cooperative terminal may also transmit data to the base station by each using a different UL resource.

By performing the above-described procedure, the source terminal and the cooperative terminal may perform client cooperation (CC) transmission.

Afterwards, while the cooperative terminal performs client cooperation transmission with the source terminal, in case UL data of the cooperative terminal are generated (S820), the cooperative terminal transmits an uplink (UL) resource allocation request message to the base station in order to be capable of transmitting its own UL data (S830). The UL resource allocation request message may include control information for differentiating the UL data of the source terminal from the UL resource allocation request message of the cooperative terminal.

Herein, the cooperative terminal may transmit the UL resource allocation request message to the base station by using the UL resource allocation region, which is received from the base station for CC, the feedback channel for CC, and so on. The UL resource allocation request procedure performed by the cooperative terminal will hereinafter be described in detail with reference to FIG. 9 to FIG. 10.

Subsequently, the cooperative terminal receives first ($1^{st}$) uplink resource allocation information for transmitting the UL data of the cooperative terminal from the base station as a response to the UL resource allocation request message (S840).

Thereafter, the cooperative terminal transmits its own UL data to the base station through the $1^{st}$ uplink resource allocation information (S850).

FIG. 9 illustrates a flow chart showing an uplink resource request (RR) procedure for having a cooperative user equipment according to another exemplary embodiment of the present invention transmit its own uplink data by using the uplink resource, which is allocated to the cooperative user equipment for Client Cooperation (CC).

Herein, the UL resource request (RR) may be indicated as a Bandwidth Request (BR) in the 802.16m system and may be indicated as a Scheduling Request (SR) in the LTE(-A) system.

As shown in FIG. 9, in order to transmit the UL data (or signal) of the source terminal, the cooperative terminal receives the $2^{nd}$ UL resource allocation information from the base station through a Client Cooperation (CC) transmission (S811). More specifically, the $2^{nd}$ UL resource allocation information refers to the uplink resource being allocated to the cooperative terminal from the base station for the CC. Herein, the $2^{nd}$ UL resource allocation information may be transmitted to the source terminal and the cooperative terminal, both performing client cooperation transmission, from the base station through a multi-cast method or a unicast method.

Thereafter, the cooperative terminal performs client cooperation transmission with the source terminal through the $2^{nd}$ UL resource allocation information (S812, S813).

Herein, in addition to transmitting the UL data (or signal) of the source terminal to the base station through the $2^{nd}$ UL resource allocation information, the cooperative terminal may perform a UL resource request, i.e., transmit a UL resource allocation request message for transmitting the UL data of the cooperative terminal itself. More specifically, by using the CC UL resource, the cooperative terminal may transmit a UL resource allocation request message to the base station in order to transmit its own signal or UL data.

Figures 10, 11:
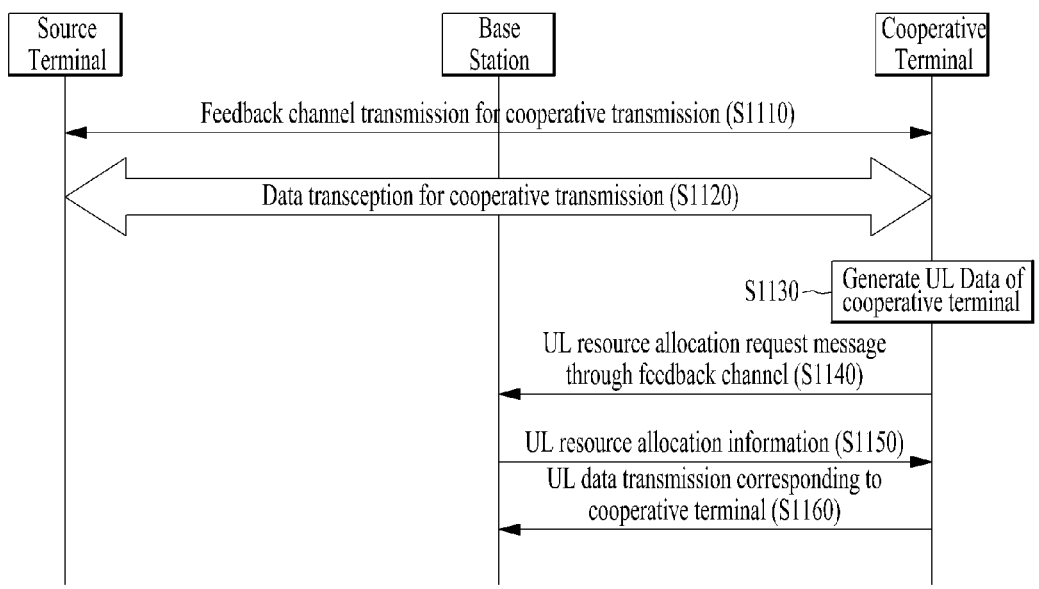
FIG. 10 illustrates an exemplary structure of a MAC PDU, which is included in an uplink resource allocation request message, the message being transmitted by the cooperative user equipment according to the exemplary embodiment of the present invention.
FIG. 11 illustrates a flow chart showing a UL resource allocation request procedure for enabling a cooperative user equipment according to another exemplary embodiment of the present invention to transmit its own UL data by using a feedback channel for Client Cooperation (CC).

More specifically, while the cooperative terminal performs client cooperation transmission, if UL data of the cooperative terminal itself are generated (S920), the cooperative terminal transmits both the UL data of the source terminal and the UL resource allocation request message to the base station through the $2^{nd}$ resource allocation information (S930). In this case, as shown in FIG. 10, the cooperative terminal may differently set up (or determine) an FID (FID=0x07) respective to the UL data of the source terminal and an FID (FID=0x03) respective to the UL resource allocation request message and may transmit the corresponding FIDs to the base station.

Subsequently, after receiving the $1^{st}$ UL resource allocation information from the base station as a response to the UL resource allocation request message (S940), the cooperative terminal transmits its own UL data to the base station through the $1^{st}$ UL resource allocation information (S950).

The base station may include resource region information respective to a resource unit (RU) or resource block (RB) for the transmission of the UL resource request message of the cooperative terminal itself in the $2^{nd}$ UL resource allocation region and, then, the base station may transmit the processed region to the cooperative terminal. Herein, the resource region information may correspond to information related to the resource size of the UL resource request message for enabling the cooperative terminal to transmit its own UL data transmission, the number of symbols or RBs, index of the RB, or the starting point of the resource region.

Additionally, during the client cooperation transmission, since both the source terminal and the cooperative terminal transmit the UL data of the source terminal to the base station by using the same UL resource, in order to enhance the detection of the base station respective to the UL resource allocation request message of the cooperative terminal being transmitted by the cooperative terminal, information on the allocated resource for the resource request of the cooperative terminal may also be transmitted to the source terminal. By using the above-described information, the source terminal may not transmit any signal to the same resource, to which the UL resource allocation request message is being transmitted, in order to prevent overlapping of the data being transmitted via cooperative transmission, or in order to prevent the request of the cooperative terminal from being influenced.

Herein, since the cooperative terminal can transmit a signal or UL data of the source terminal along with the UL resource allocation request message, in order to allow the base station to differentiate (or identify) the UL resource allocation request message from the UL data of the source terminal, the cooperative terminal may include control information for performing such differentiation (or identification) in the UL resource allocation request message and may transmit the corresponding message.

The control information may correspond to a header type included in the MAC signaling header being transmitted by the cooperative terminal to the base station.

For example, in case of the 802.16 system, may be configured of a 5-bit sequence based upon backward compatibility with a MAC signaling header type of the conventional 802.16m. Herein, the 5-bit sequence may correspond to a bit sequence that is being reserved for the header type in the 802.16m system. More specifically, a new header type signifying a bandwidth request (BR) respective to the UL data of the cooperative terminal itself is defined during the performance of the client cooperation transmission.

Additionally, the control information may correspond to an indicator indicating a BR respective to the UL data of the cooperative terminal or a BR respective to the UL data of the source terminal.

Moreover, in order to perform client cooperation transmission, the cooperative terminal receives a cooperative terminal grouping ID or pairing ID from the base station, and, then, the cooperative terminal uses the received grouping ID or pairing ID for the UL resource request for the client cooperation transmission. In this case, by requesting the base station for a CC UL resource allocation including the grouping ID or pairing ID, the cooperative terminal may perform a BR for the CC.

Furthermore, in order to differentiate the UL resource allocation request for the client cooperation transmission from the UL resource allocation request for the UL data transmission of the cooperative terminal itself, the cooperative terminal may include an STID of the cooperative terminal in the MAC signaling header, which is transmitted by the cooperative terminal. In this case, the header may be defined as a BR of the cooperative terminal including the STID. Herein, the MAC signaling header may signify the UL resource allocation request message.

As an example of the MAC signaling header, in a MAC signaling header type of the 802.16m system, any one of 5 bit sequences from '01000' to '11111' may be allocated may be allocated as the header type for the UL data transmission of the cooperative terminal itself.

Herein, the MAC signaling header including the STID of the cooperative terminal may include information, such as BR FID, BR Size, header length, header type, header FID, CC indicator, CC data indicator, and so on.

Herein, the STID of the cooperative terminal refers to a terminal identifier (or Station Identifier (STID)) of the cooperative terminal instead of the pairing or grouping ID, which is allocated to the source terminal and the cooperative terminal from the base station for the client cooperation transmission.

While performing client cooperation transmission, i.e., while the UL data of the source terminal is being transmitted to the base station, in order to transmit the signal or UL data of the cooperative terminal itself to the base station, the cooperative terminal transmits a UL resource allocation request message including the STID of the cooperative terminal to the base station.

Herein, during the client cooperation transmission, the BR FID, which is included in the UL resource allocation request message, may correspond to an FID defined in advance (or pre-defined) by the base station for the BR of the cooperative terminal.

The base station may set up (or determine) the pre-defined FID based upon the grouping ID or pairing ID, which is allocated to the source terminal and the cooperative terminal for the client cooperation transmission.

More specifically, in case UL data corresponding to the cooperative terminal itself are generated while performing client cooperation transmission, when the cooperative terminal performs a BR for transmitting its own UL data to the base station, the cooperative terminal uses the FID, which is pre-defined by the base station. More specifically, by using the FID corresponding to the client cooperation transmission and the FID for transmitting the UL data of the cooperative terminal itself (two FIDs each being different from one another), the cooperative terminal may perform a resource allocation request respective to the UL data to the base station.

More specifically, the MAC signaling for enabling the cooperative terminal to transmit a UL resource allocation request message respective to the UL data of the cooperative terminal itself may consist of a structure having a client cooperation transmission specific PDU and a UL resource allocation request message specific PDU for transmitting the UL data of the cooperative terminal itself, i.e., a structure having two PDUs. The two PDUs may be consecutively aligned or may be aligned to be separated from one another.

FIG. 10 illustrates an exemplary structure of a MAC PDU, which is included in an uplink resource allocation request message, the message being transmitted by the cooperative user equipment according to the exemplary embodiment of the present invention.

As shown in FIG. 10, in order to perform UL data transmission of the source terminal for performing client cooperation transmission and to perform UL transmission respective to the signal or data of the cooperative terminal itself, the cooperative terminal transmits two MAC PDUs by performing pairing.

At this point, as shown in FIG. 10, the FIDs being used for the transmission of each MAC PDU are different from one another. More specifically, by using two different FIDs, the cooperative terminal transmits the UL data of the source terminal and the UL resource allocation request message for transmitting the UL data of the cooperative terminal itself to the base station.

Herein, the details shown in FIG. 10 merely correspond to an exemplary embodiment of the present invention, and, therefore, at least 3 or more MAC signaling PDUs may be transmitted by the cooperative terminal to the base station, and, in this case, the 3 MAC PDUs may be grouped, so as to be transmitted to the base station. Herein, each PDU may include a different FID.

In another example, the UL data of the source terminal and the UL resource allocation request message for transmitting the UL data of the cooperative terminal itself may be transmitted by using the same FID and by only using different STIDs, and, alternatively, different FIDs may be used while the same STID is used, as described above. Herein, as an example of using different FIDs and using the same STID, the cooperative terminal may unify the STID with the pairing ID or grouping ID, which is received from the base station for the client cooperation transmission.

FIG. 11 illustrates a flow chart showing a UL resource allocation request procedure for enabling a cooperative user equipment according to another exemplary embodiment of the present invention to transmit its own UL data by using a feedback channel for Client Cooperation (CC).

In order to perform client cooperation transmission, the cooperative terminal receives a cooperative terminal transmission feedback channel from the base station (S1110). Herein, the feedback channel may be transmitted through a common or dedicated A-MAP or through a feedback allocation A-MAP IE, in case of the 802.16m system, and may be transmitted through a PBCH or PDCCH, in case of the LTE (-A) system.

Herein, in case the feedback channel is transmitted through a common A-MAP, the common A-MAP may be masked with the grouping ID or pairing ID, so as to be transmitted.

Additionally, in case the feedback channel is transmitted through the dedicated A-MAP, the dedicated A-MAP may be masked with the STID of each terminal, so as to be transmitted.

More specifically, the base station may transmit the information on the feedback channel for the client cooperation transmission to the source terminal and the cooperative terminal through a DL signal being transmitted during the client cooperation transmission procedure. The feedback channel may be used for the CC DL/UL transmission.

Herein, the feedback channel is used in order to allow the cooperative terminal 세 request for UL resource allocation for the transmission of its own UL data while performing the client cooperation transmission.

Additionally, in case the cooperative terminal receives a signal or data for performing client cooperation transmission from the base station, or when the signal or data is/are grouped by the base station for the CC operation, the CC feedback channel information may be transmitted from the base station to the cooperative terminal through a cc_grouping_Ind signal.

Furthermore, the CC feedback channel may be commonly allocated to both the source terminal and the cooperative terminal, or the CC feedback channel may be allocated to each terminal performing the CC feedback channel.

Herein, in case the CC feedback channel is commonly allocated to both the source terminal and the cooperative terminal, the source terminal and the cooperative terminal may enhance transmission efficiency by transmitting the same signal to the same region, or by setting up different feedback periods (each being identified (or differentiated) by using a TDM or FDM) in the feedback channel of the two terminals, the CC feedback channels may be used without any collision between one another.

For example, in the 802.16m system, when the base station commonly allocates the CC feedback channel to the source terminal and the cooperative terminal through a Feedback Allocation A-MAP, the source terminal may transmit a signal to the base station by using a short-term feedback period, and the cooperative terminal may transmit a signal to the base station by using a long term feedback period.

The base station may include the feedback period indication in a client cooperation transmission confirmation message (CC_confirm message) or in a client cooperation transmission response message (CC_Rsp message), and, then, the base station may transmit the corresponding feedback period indication to the source terminal and the cooperative terminal. In this case, after receiving the CC_confirm message or CC_Rsp message, the source terminal and the cooperative terminal may determine (or identify) the feedback channel period.

Thereafter, while transmitting or after transmitting the UL data of the source terminal to the base station during the CC operation (S1120), the cooperative terminal uses the allocation CC feedback channel, so as to perform a UL resource request for transmitting UL data or signal of the cooperative terminal itself, i.e., so as to perform UL resource allocation request message transmission.

More specifically, in case the UL data of the cooperative terminal itself are generated, during the client cooperation transmission operation, the cooperative terminal transmits the UL resource allocation request message to the base station through the CC feedback channel, and the cooperative terminal transmits the UL data of the cooperative terminal itself to the base station by using the UL resource allocation information, which is received as a response to the UL resource allocation request message (S1130~S1160). The UL resource allocation request message of the cooperative terminal being transmitted through the CC feedback channel may be configured of 6 bits of information bits.

In another example, the cooperative terminal uses the feedback channel, which is allocated to the source terminal in order to perform client cooperation transmission, so as to transmit the UL resource allocation request message for transmitting the UL data or signal of the cooperative terminal itself.

In this case, after transmitting a client cooperation request message for performing client cooperation transmission to the base station, the source terminal may be allocated with a feedback channel, which corresponds to the source terminal, from the base station through the A-MAP or PDCCH.

The received feedback channel of the source terminal may be transmitted to the cooperative terminal from the base station during the process of pairing or grouping the source terminal and the cooperative terminal, which is performed by the base station, for performing the client cooperation transmission, or the received feedback channel of the source terminal may be transmitted to the cooperative terminal during the process of transmitting information on the client cooperation transmission (e.g., a response message respective to the client cooperation request message) to the cooperative terminal.

Therefore, as described above, the cooperative terminal may transmit UL resource allocation, i.e., a UL resource allocation request message for transmitting the UL data of the cooperative terminal itself to the base station through the feedback channel of the source terminal.

In this case, the UL resource allocation request message being transmitted through the feedback channel of the source channel may include control information for identifying the UL resource allocation request for transmitting the UL data of the source terminal and the UL data of the cooperative terminal. For example, the control information may correspond to a terminal indicator field.

In another example, before performing the client cooperation transmission, by having the cooperative terminal use the feedback channel allocated from the base station, in case UL data transmission of the cooperative terminal itself occurs during the client cooperation transmission operation, the cooperative terminal may transmit the UL resource allocation request message.

For example, in the 802.16m system, the terminal is allocated with a feedback channel from the base station through an A-MAP, and the terminal performs feedback by using the allocated feedback channel at each interval for a predetermined duration.

The feedback channel may be automatically resource de-allocated at the beginning of a frame or during a sleep and/or idle section.

In this case, if the terminal being allocated with the feedback channel is set up as the cooperative terminal for the client cooperation transmission operation (CC operation), by having the base station provide a confirmation or indication respective to the feedback channel to the terminal set up as the cooperative terminal, instead of being de-allocated, the feedback channel, which is allocated from the base station prior to the client cooperation, may be used for transmitting the UL resource allocation request message for transmitting the UL data of the cooperative terminal itself. More specifically, the cooperative terminal performs a UL resource request for transmitting the UL data of the cooperative terminal itself through the feedback channel that has not been de-allocated in accordance with a feedback channel transmission period, which is received from the base station.

As described above, in case the cooperative terminal performs a UL resource request respective to the cooperative terminal itself through the feedback channel, a primary fast feedback channel may be used in order to take the backward compatibility with the conventional 802.16m system, i.e., a greenfield operation, into consideration.

In this case, in addition to the UL resource allocation request information, the information being transmitted through the primary fast feedback channel may include client cooperation transmission indication information (CC indication), user indication information (user indication), and so on.

The above-described exemplary embodiments and varied (or modified) embodiments may be combined with one another. Therefore, instead of having each exemplary embodiment individually implemented (or realized), whenever required multiple embodiments may be configured in combination. Anyone being skilled in the art and having read the description of the present invention may be capable of easily implementing (or realizing) the combination of exemplary embodiments according to the present invention. And, therefore, detailed description of the same will be omitted for simplicity. Nevertheless, even if the detailed description is omitted, the corresponding embodiment will not be excluded from the present invention, and, it will be understood that the corresponding embodiment is also included in the scope of the present invention.

The above-described exemplary embodiments and varied (or modified) embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

For example, the method according to the present invention may be stored in the storage medium (e.g., internal memory, flash memory, hard disc, and so on), and the method according to the present invention may be implemented as codes or commands within a software program, which can be executed by the processor (e.g., microprocessor). This will hereinafter be described in more with reference to FIG. 12.

Figure 12:
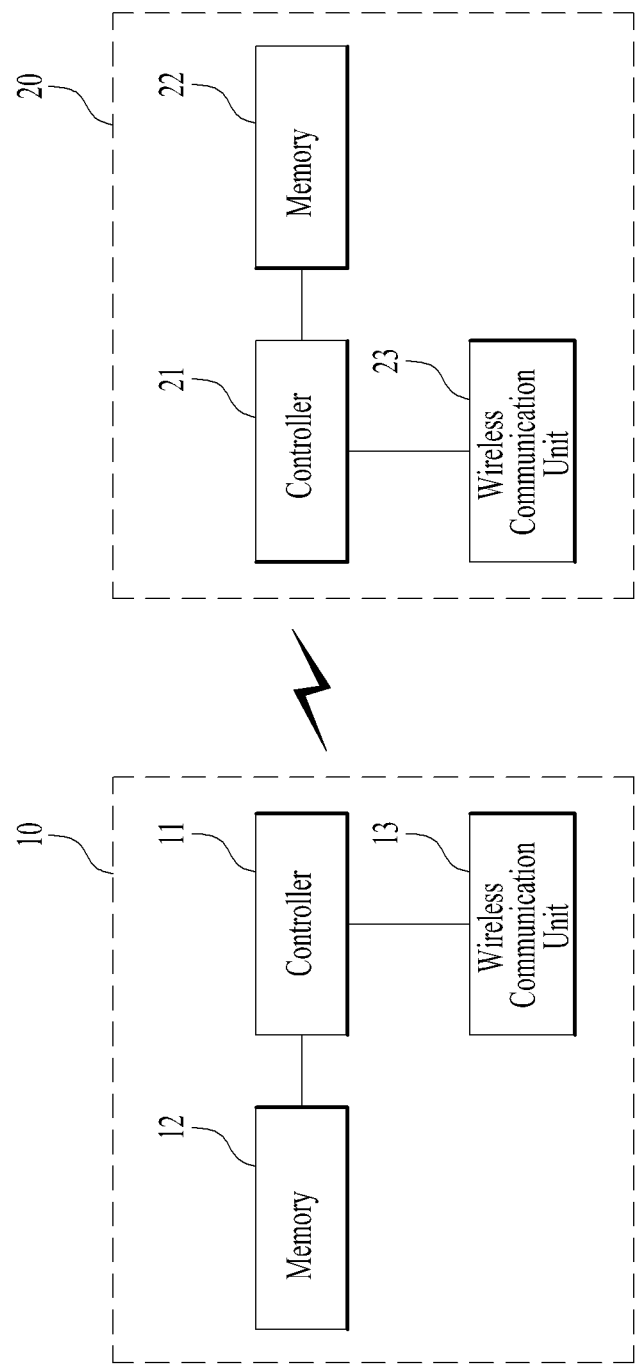
FIG. 12 illustrates an internal block view of a user equipment and a base station in a wireless communication system to which the exemplary embodiment of the present invention can be applied.

FIG. 12 illustrates an internal block view of a user equipment and a base station in a wireless communication system to which the exemplary embodiment of the present invention can be applied.

The terminal (10) includes a controller (11), a memory (12), and a radio frequency (RF) (or wireless communication) unit (13).

Additionally, the terminal (10) also includes a display unit, a user interface unit, and so on.

The controller (11) realizes the proposed functions, procedures, and/or methods. Layers of the radio (or wireless) interface may be implemented (or realized) by the controller (11).

The memory (12) is connected to the controller (11) and stores a protocol or parameter for performing radio frequency communication (or wireless communication). More specifically, the memory (12) stores a terminal operating system, applications, and general files.

The RF unit (13) is connected to the controller (11), so as to transmit and/or receive radio signals.

Furthermore, the display unit displays diverse information of the terminal, and the display unit may use well-known elements, such as LCD (Liquid Crystal Display), OLED (Organic Light Emitting Diodes), and so on. The user interface unit may be implemented (or realized) by combining well-known unit interfaces, such as a keypad or a touchscreen, and so on.

The base station (20) includes a controller (21), a memory (22), and a RF unit (radio frequency unit) (23).

The controller (21) realizes the proposed functions, procedures, and/or methods. Layers of the radio (or wireless) interface may be implemented (or realized) by the controller (21).

The memory (22) is connected to the controller (21) and stores a protocol or parameter for performing radio frequency communication (or wireless communication).

The RF unit (23) is connected to the controller (21), so as to transmit and/or receive radio signals.

The controller (11, 21) may include ASIC (application-specific integrated circuit), another chip set, a logical circuit, and/or a data processing device. The memory (12, 22) may include a ROM (read-only memory), a RAM (random access memory), a flash memory, a memory card, a storage medium, and/or another storage device. The RF unit (13, 23) may include a baseband circuit for processing radio signals. When the exemplary embodiment of the present invention is implemented in the form of software, the above-described method may be implemented (or realized) in the form of a module (procedure, function, and so on) executing the above-described functions. The module may be stored in the memory (12, 22) and may be executed by the controller (11, 21).

The memory (12, 22) may be located inside or outside of the controller (11, 21), and the memory (12, 22) may be connected to the controller (11, 21) through diverse well-known means.

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of" or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Furthermore, terms including numeric expressions, such as first ($1^{st}$), second ($2^{nd}$), and so on, used in the specification of the present invention may be used to described diverse elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

When an element is described as "being connected to" or as "accessing" another element, either the corresponding element may be directly connected to or accessing the other element, or yet another element may exist between the corresponding element and the other element. Alternatively, when an element is described as "being directly connected to" or as "directly accessing" another element, it should be understood that yet another (or a third) element does not exist between the two elements.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided that they come within the scope of the appended claims and their equivalents, and it is not intended to limit the present invention only to the examples presented herein.

What is claimed is:

1. A resource allocation method of a cooperative terminal for transmitting uplink (UL) data during a client cooperation (CC) transmission procedure, the method comprising:
   performing the CC transmission with a source terminal;
   transmitting an UL resource allocation request message to a base station (BS) for transmitting first UL data of the cooperative terminal, the first UL data generated during the CC transmission procedure;
   receiving first UL resource allocation information from the BS as a response to the UL resource allocation request message; and
   transmitting the first UL data to the BS according to the first UL resource allocation information,
   wherein the UL resource allocation request message includes control information differentiating second UL data of the source terminal from the UL resource allocation request message,
   wherein the UL resource allocation request message is transmitted according to second UL resource allocation information for transmitting the second UL data of the source terminal, and
   wherein the UL resource allocation request message is transmitted by using paired MAC PDUs comprising a first MAC PDU including the control information and a second MAC PDU including the second UL data.

2. The method of claim 1, wherein performing the CC transmission with the source terminal comprises:
   receiving the second UL resource allocation information from the BS;
   receiving UL data of the source terminal; and
   transmitting the second UL data to the BS using the second uplink resource allocation information.

3. The method of claim 2, further comprising:
   receiving feedback channel information from the BS, the feedback channel information used for the CC transmission; and
   transmitting the UL resource allocation request message by using the received feedback channel information.

4. The method of claim 2, wherein the first UL resource allocation information is received by using the second UL resource allocation information.

5. The method of claim 2, wherein the control information corresponds to a MAC signaling header that is configured as a 5-bit sequence.

6. The method of claim 5, wherein the MAC signaling header includes a terminal identifier or station identifier (STID) of the cooperative terminal or an FID of the first UL.

7. The method of claim 6, wherein the UL resource allocation request message comprises a MAC PDU having an FID corresponding to the CC transmission and a MAC PDU having an FID corresponding to the first UL data.

8. The method of claim 3, wherein the feedback channel information corresponds to either a dedicated feedback channel allocated to each of the source terminal and the cooperative terminal or to a common feedback channel commonly allocated to the source terminal and the cooperative terminal.

9. The method of claim 8, wherein:
   the feedback channel information corresponds to the common feedback channel;
   the cooperative terminal uses the common feedback channel via a feedback cycle comprising long time intervals.

10. The method of claim 3, wherein the UL resource allocation request message is transmitted via an allocated dedicated feedback channel.

11. The method of claim 3, wherein the UL resource allocation request message is 6 bits.

12. A cooperative terminal for allocating resources for transmitting uplink (UL) data during a Client Cooperation (CC) transmission procedure, the terminal comprising:
   a radio frequency unit configured to transceive a radio signal; and
   a processor configured to:
   perform the client cooperation (CC) transmission with a source terminal;
   transmit an uplink resource allocation request message to a base station (BS) for transmitting first UL data of the cooperative terminal, the first UL data generated during the CC transmission procedure;
   receive first UL resource allocation information from the BS as a response to the UL resource allocation request message; and
   transmit the first UL data to the BS according to the first UL resource allocation information,
   wherein the UL resource allocation request message includes control information differentiating second UL data of the source terminal from the UL resource allocation request message,
   wherein the UL resource allocation request message is transmitted according to second UL resource allocation information for transmitting the second UL data of the source terminal, and
   wherein the UL resource allocation request message is transmitted by using paired MAC PDUs comprising a first MAC PDU including the control information and a second MAC PDU including the second UL data.

* * * * *